US011700292B2

(12) United States Patent
Curry et al.

(10) Patent No.: US 11,700,292 B2
(45) Date of Patent: Jul. 11, 2023

(54) COLLABORATION COMPONENTS FOR SHARING CONTENT FROM ELECTRONIC DOCUMENTS

(71) Applicant: Microsoft Technology Licensing, LLC, Redmond, WA (US)

(72) Inventors: Ian Dwyer Curry, Seattle, WA (US); Kathryn Veronica Jean Sullivan, Redmond, WA (US); Seth Fox, Seattle, WA (US); David Benjamin Lee, Rocklin, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/346,725

(22) Filed: Jun. 14, 2021

(65) Prior Publication Data

US 2022/0400141 A1 Dec. 15, 2022

(51) Int. Cl.

| | |
|---|---|
| ***H04L 65/401*** | (2022.01) |
| ***G06F 16/176*** | (2019.01) |
| ***H04L 67/06*** | (2022.01) |
| ***H04L 67/1095*** | (2022.01) |

(52) U.S. Cl.

CPC ........ *H04L 65/4015* (2013.01); *G06F 16/176* (2019.01); *H04L 67/06* (2013.01); *H04L 67/1095* (2013.01)

(58) Field of Classification Search

CPC .. H04L 65/4015; H04L 67/06; H04L 67/1095

See application file for complete search history.

(56) References Cited

U.S. PATENT DOCUMENTS

| | | | | |
|---|---|---|---|---|
| 9,268,858 | B1 * | 2/2016 | Yacoub | G06F 16/24573 |
| 9,667,676 | B1 | 5/2017 | Lo et al. | |
| 2014/0143681 | A1 * | 5/2014 | Chandra | H04L 51/08 715/752 |
| 2014/0201154 | A1 * | 7/2014 | Varadharajan | G06F 11/1448 707/647 |
| 2016/0321225 | A1 * | 11/2016 | Keslin | G06Q 10/101 |

(Continued)

FOREIGN PATENT DOCUMENTS

WO 2017100021 A1 6/2017

OTHER PUBLICATIONS

"International Search Report and Written Opinion Issued in PCT Application No. PCT/US22/028662", dated Jul. 29, 2022, 15 Pages.

*Primary Examiner* — Mohamed A. Wasel
*Assistant Examiner* — Kidest Mendaye

(57) ABSTRACT

In various implementations, a productivity application allows selected content from an electronic document to be shared with and edited by multiple users through instances of a collaboration component. The collaboration component includes a distributed data structure that stores state information about the shared content. The component also includes application logic for managing the state information to reflect user edits and other such changes. This allows the selected content to be shared with the users in any application that supports the collaboration component and without the entirety of the document having to be shared. A user can experience the content in the context of applications other than the productivity application that hosts the document.

20 Claims, 10 Drawing Sheets

(56) References Cited

U.S. PATENT DOCUMENTS

| | | | | |
|---|---|---|---|---|
| 2016/0321227 | A1* | 11/2016 | Keslin | G06F 40/166 |
| 2017/0132300 | A1* | 5/2017 | Sekar | G06F 16/26 |
| 2017/0199657 | A1* | 7/2017 | Mullins | G06F 3/0482 |
| 2017/0364866 | A1 | 12/2017 | Steplyk et al. | |
| 2018/0219923 | A1 | 8/2018 | Berger et al. | |
| 2018/0260100 | A1* | 9/2018 | Kessler | H04L 67/125 |
| 2018/0341502 | A1* | 11/2018 | Rabasa | G06F 9/44526 |

* cited by examiner

COLLABORATION COMPONENTS FOR SHARING CONTENT FROM ELECTRONIC DOCUMENTS

TECHNICAL FIELD

Aspects of the disclosure are related to the field of software applications and services and, more particularly, to technology for collaborating on electronic content.

BACKGROUND

Collaboration is a feature of many software applications and services that allows multiple users to work together on word processing documents, spreadsheets, presentations, notebooks, and the like, all of which are referred to herein as electronic documents (or just documents). In many implementations, each user can view and edit a given document locally at the same time as other users edit their instances of the same document, and every user can see in near real-time the changes being made to the document by the others. Some secondary features include the ability to roll-back changes and to filter the changes made by specific people.

Whether provided in the context of a native application, a browser-based application, or a mobile application, collaboration requires a great deal of coordination and communication between and amongst the multiple applications through which users experience a shared document. In one model, the client applications keep their respective instances of a document up to date by sending and receiving their changes to a server that propagates the changes to the other clients. As an example, one user in a collaboration session provided by an application may edit a shared document causing the application to send one or more messages indicating the edit. The other applications engaged in the collaboration session receive the messaging and persist the edit to their local copies of the document.

Collaborating in this manner has become an immensely popular and productive way to produce content. One drawback is that it requires an entire document to be shared with another user when doing so may not be optimal. Some protocols that mitigate this problem provide access control to different sections of a document based on the identity of a user. Other ad-hoc solutions include simply copying and pasting sub-sections of a document into an email or message to share that way with another user. Neither solution is entirely satisfactory as they do not provide for content to be shared in a lightweight and accessible manner.

OVERVIEW

Technology is disclosed herein that allows selected content from an electronic document to be shared with and edited by multiple users through instances of a collaboration component. The collaboration component includes a distributed data structure that stores state information about the shared content. The component also includes application logic for managing the state information to reflect user edits and other such changes. This allows the selected content to be shared with the users in any application that supports the collaboration component and without the entirety of the document having to be shared. In other words, a user can experience the content in the context of applications other than the productivity application that hosts the document.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modification's, and equivalents.

DETAILED DESCRIPTION

Technology is disclosed herein that allows users to collaborate on content in a lightweight and accessible manner. In various implementations, a productivity application provides the ability for users to share content through instances of a collaboration component. The collaboration component comprises a distributed data structure that stores state information about the content, as well as application logic for managing the state information to reflect changes made to the content by the user. Any number of application types can host an instance of the collaboration component so that the selected content can be edited from within different types of applications. That is, the content may be created in one type of application yet shared and edited in other types of applications by way of the collaboration component(s).

In a brief example, a user creates an electronic document that includes various types of content such as text and images. The user can select some of the content to share through a collaboration component. The application registers the collaboration component with an online service and identifies the other users with whom to share the selected content. The other users receive a link or other such identifier to the selected content which is provided though local instances of the collaboration component. The multiple instances of the collaboration component exchange state information with each other to keep the state of the component synchronized in real-time. The relay service merely tracks the components and associated users and passes the state updates as they occur.

From the perspective of the productivity application that originated the shared experience, its instance of the collaboration component appears in its user interface as another feature of the application. The overall user experience integrates the user interface aspects of the collaboration component with the other existing components of the document's user interface. As changes are made remotely by the other users to the selected content, the changes are surfaced in the user interface to the collaboration component. The changes may be persisted to the document itself by user choice or automatically.

Figure 1:
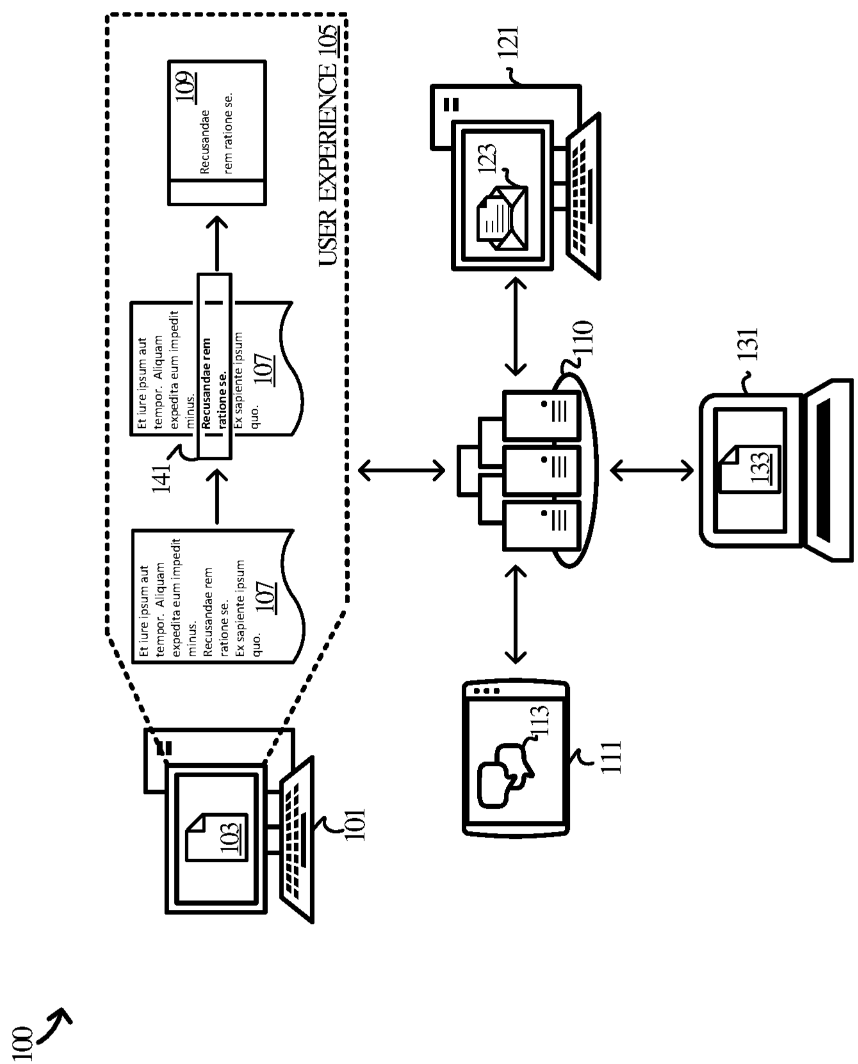
FIG. 1 illustrates a collaboration environment in an implementation.
Figure 9:
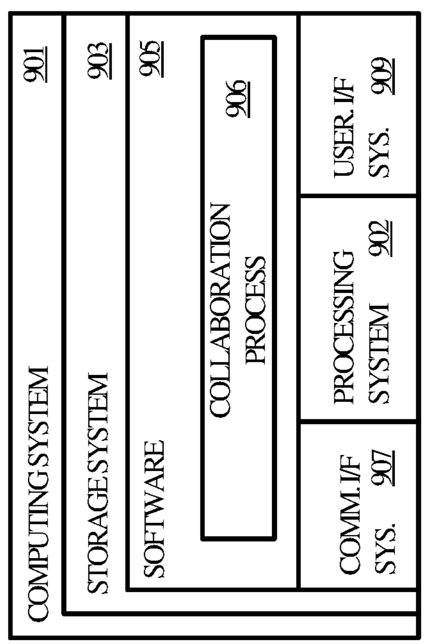
FIG. 9 illustrates a computing system suitable for implementing the various operational environments, architectures, processes, scenarios, and sequences discussed below with respect to the Figures.

FIG. 1 illustrates a collaboration environment 100 in an implementation. Collaboration environment includes computing devices 101, 111, 121, and 131, as well as online service 110. Examples of computing devices 101, 111, 121, and 131 include personal computers, laptop computers, tablet computers, mobile phones, and any other computing devices, of which computing device 900 in FIG. 9 is broadly representative. Computing devices 101, 111, 121, and 131 communicate with online service 110 via one or more networks (not shown), example of which include internets and intranets, the Internet, wired and wireless networks, local area networks (LANs), and wide area networks (WANs).

Computing devices 101, 111, 121, and 131 are each capable of running one or more software applications capable of supporting collaboration components as disclosed herein. Examples of such software applications include word processors, spreadsheet applications, email applications, cloud storage applications, messaging applications, or any other productivity application, content creation application, collaboration application, or the like. The applications may be natively installed and executed applications, browsers-based applications, mobile applications, streaming applications, or any variation or combination thereof.

In this specific implementation, computing device 101 includes a word processing application for creating and editing electronic documents such as document 103. Computing device 111 includes a communication application for calling others, hosting meetings, and messaging others as represented by messages 113. Computing device 121 includes a personal information management application (e.g., email) for sending and receiving emails such as email 123. Computing device 131 includes a word processing application for working with electronic documents such as document 133. It may be appreciated that any of the aforementioned computing devices may include other software applications in addition to—or instead of—those mentioned herein, also capable of supporting collaboration components as contemplated herein.

Figure 2:
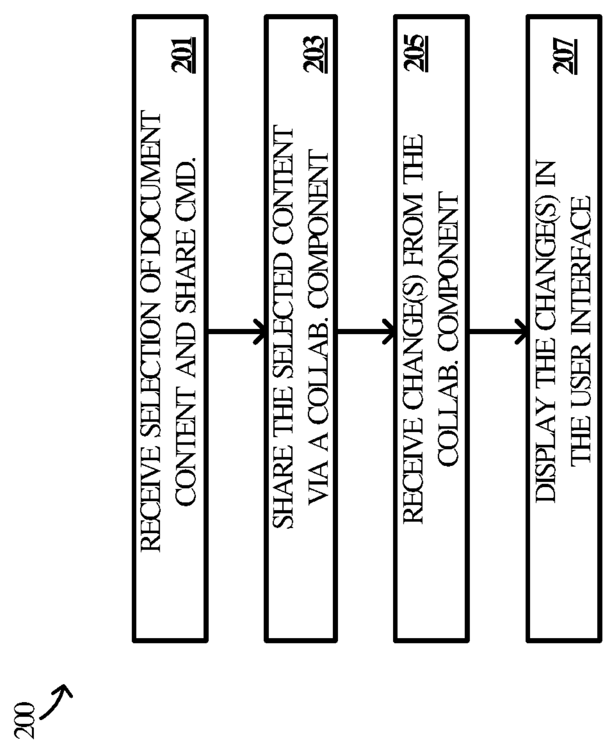
FIG. 2 illustrates a collaboration process in an implementation.

Document 103 on computing device 101 is representative of any electronic document such as a word processing document, a spreadsheet workbook, or a slide presentation. Document 103 is opened by a productivity application running on computing device 101 such as a word processor, spreadsheet application, or the like. Computing device 101 includes other software programs such as an operating system that, in cooperation with the productivity application, provides a user experience 105 for interacting with document 103. The user experience 105 may include one or more user interface components that allow the contents of document 103 to be displayed on a document canvas 107. User experience 105 provides other aspects of a user's interaction with document 103 such as the ability to edit text, select content in the document, and share the content with others. Collaboration process 200 in FIG. 2 is illustrative of a process employed by computing device 101 to facilitate such sharing.

Collaboration process 200 may be implemented in program instructions in the context of any of the software applications, modules, components, or other such elements of computing device 101 such as productivity applications, operating system software, application frameworks, and/or other software. The program instructions are executed by one or more processors and direct computing device 101 to operate as follows, referring parenthetically to the steps in FIG. 2 in the context of collaboration environment 100 for exemplary purposes.

To begin, computing device 101 receives a selection 141 of content in document canvas 107 (step 201). The content may be, for example: text from a document, a table, a chart, an image, or any other content in a document. The selection may be made by way of a mouse action, a touch gesture, a spoken command, or any other suitable user input. Here, selection 141 captures a section of text displayed on document canvas 107.

Computing device 101 then shares the selected content with one or more other users through a collaboration component 109 (step 203). The collaboration component 109 includes state information and application logic for managing its state to reflect changes made to the selected content by other users in their respective application environments. The state information is stored in a distributed data structure to allow all of the instances of the component to synchronize their state when edits or other changes are made per the application logic. As users edit the selected content in their instances of the component, their changes are propagated through the distributed data structure so that all other instances of the component are updated to include the changes.

The instance of collaboration component 109 hosted by computing device 101 receives the changes made by the other users working remotely in their instances of the component. However, the changes are not immediately persisted to the source document. Rather, computing device 101 displays the changes in a user interface to the collaboration component (step 207), examples of which include a side view of the changes or other similar within the user interface to the productivity application. Computing device 101 may optionally integrate or otherwise persist the changes to the underlying document at the prompting of a user or automatically.

Figure 3A:
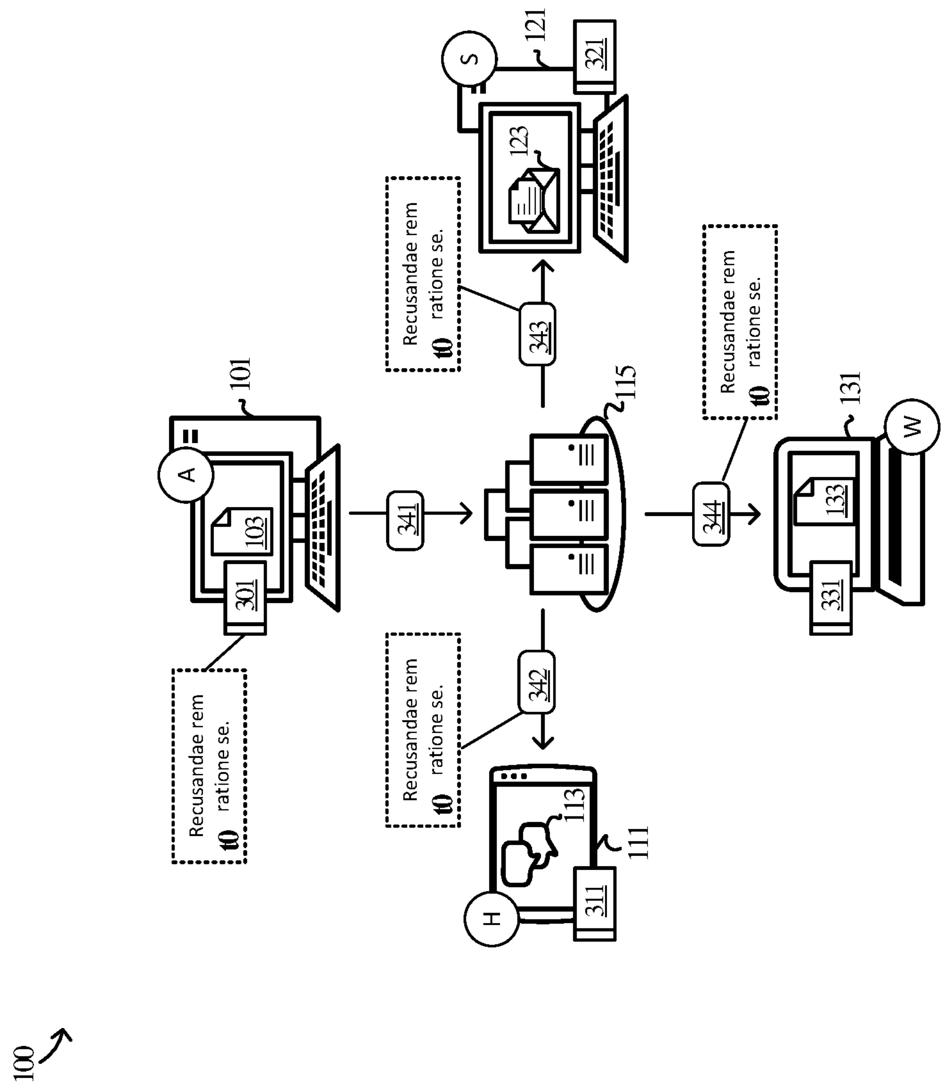
FIG. 3A-3B illustrate an operational scenario in an implementation.
Figure 3B:
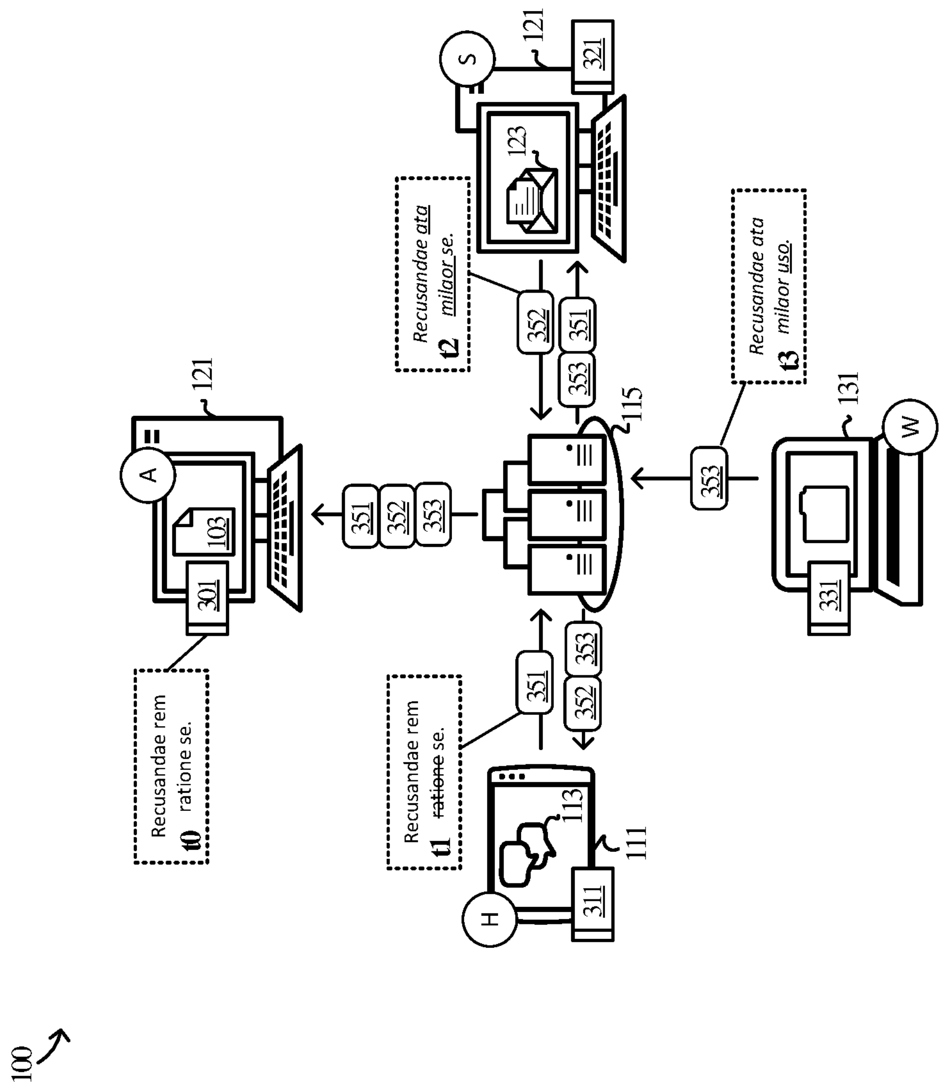

FIGS. 3A-3B illustrate an operational scenario with respect to collaboration environment 100 in an implementation where computing device 101 employs collaboration process 200. In FIG. 3A, a first user "A" operates the device to open document 103 in a productivity application. The electronic document includes content such as text and images, some of which the user desires to share with others through a collaboration component. Accordingly, the user provides user input via a mouse, tough gesture, or other such mechanism to select a portion of the content. The user also elects to share the content via a collaboration component. The application responsively instantiates collaboration component 309 and populates it with the selected content at time "t0."

Instantiating the collaboration component is a task that may be performed by the productivity application, by a supporting framework internal or external with respect to the application, or a combination of the two. The collaboration component is created within the runtime environment of computing device 101 but is also registered with online service 115. Registering the component includes identifying its name and the identity of those with whom it is to be shared. Computing device 101 sends one or more messages 141 to online serviced 115 to register the component as well as to provide the contents of the collaboration component, which include application logic and state information. The application logic governs the behavior of the component, while the state information indicates the state of the content being shared through the component.

Online service 115 receives the registration messages and shares the collaboration component with the other users H, S, and W using computing devices 111, 121, and 131 respectively. The collaboration component is shared with the other users through messages 342, 343, and 344, which effectively identify the component so that the application(s) and/or frameworks on computing devices 111, 121, and 131 can reproduce and synchronize the shared content in the context of local instances of collaboration component 309. The local instances of collaboration component 309 are represented by component 311 on computing device 311, component 321 on computing device 121, and component 331 on computing device 131.

The local instances of collaboration component 309 may be opened in the context of any application that supports a suitable collaboration framework. The collaboration framework may itself be a component of an operating system, a component of the application, or its own stand-alone framework. However, in most instances the collaboration framework is loaded within the context of the application that provides the user experience to an end-user. For example, collaboration component 311 is opened by computing device 111 in the context of a messaging application, collaboration component 321 is opened in the context of an email application, and collaboration component 331 is opened in the context of another word processing application. In other words, the various instances of collaboration component 309 can be opened not only in the same type of application as the application used to create it (e.g., a word processing application), but in other types of applications as well (e.g., a messaging application and an email application).

The users on the receiving end of the shared component are able to view a selected content within their present user experience. For example, user H can see the selected content within a user interface to her messaging application, while user S can see the selected content within a user interface to her email application. Moreover, the users can edit the selected content and/or otherwise interact with it per the application logic that is part of the collaboration content. The local instances of the collaboration content are interpreted or otherwise executed by the components of their supporting framework such that the selected content can be displayed in an integrated manner with the surrounding content of their user experience. For instance, the selected content can be displayed within the visual context of a message to user H, while it can be displayed within the visual context of an email to user S. Of course, the selected content can also be displayed to user W within a user interface to his word processing application.

As such, the various users can make changes to the selected content in the form of additions, deletions, or any other modification supported by the application logic of the collaboration components. FIG. 3B illustrates the messaging flow as the user make their edits. At time "t1," user H makes one change to the selected content, while user S makes another change at "t2." User W also makes a change at time "t3." The changes cause a state change in each collaboration component which is relayed through online service 115 to each other instance of the collaboration component. For example, the change made by user H is relayed to all the other instances of the collaboration component so that, when user S is making her changes, she is doing so to a version of the selected content that has been updated to reflect the change made by user H. Similarly, when user W is making his changes to the selected content, he is doing so with respect to a version that has been updated to include both of the preceding changes. The changes are sent via messages 351, 353, and 352 to relay server 115, which passes them on to the other instances of the collaboration component. Thus, each of the collaboration components receive update messages on the state of the component and the current state can be maintained and reflected in each local environment.

Figure 4:
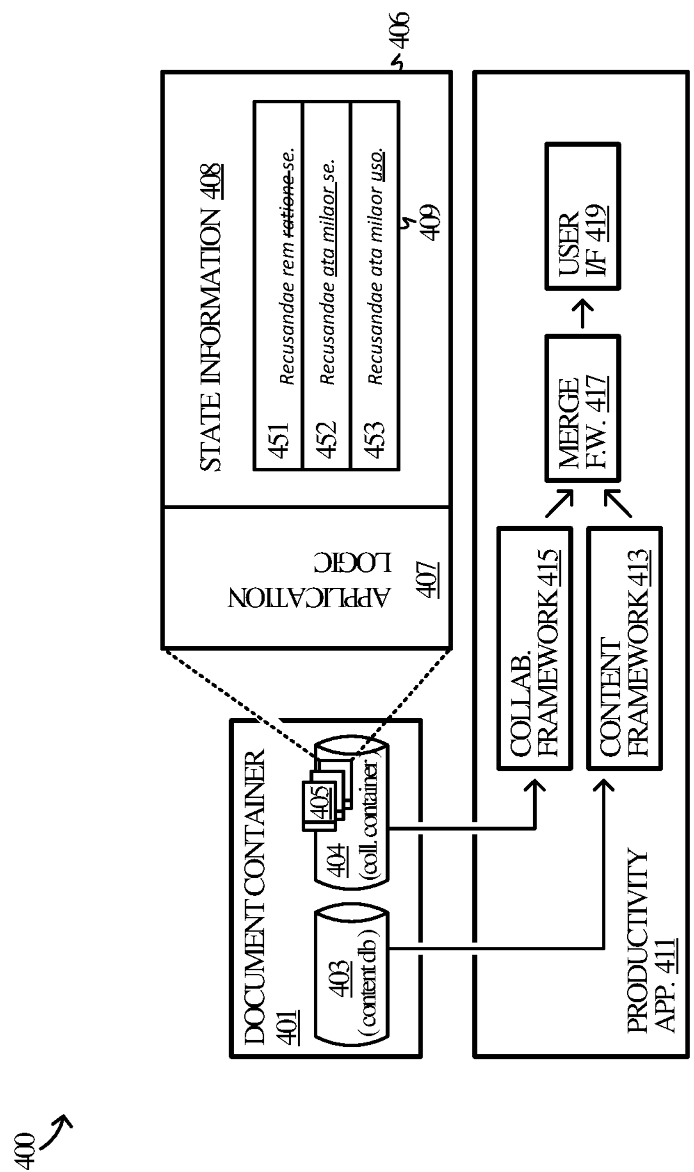
FIG. 4 illustrates a software architecture in an implementation.

FIG. 4 illustrates a software architecture 400 in an implementation. Software architecture 400 includes document container 401 and productivity application 411. Document container 403 is representative of a data structure for implementing an electronic document and includes content database 403 and collaboration container 404. Content database 403 is representative of any suitable data structure(s) for storing and organizing document content such as text, images, and the like. Collaboration container 404 is representative of a data structure for storing collaboration components 405 that enhance the user experience with respect to an electronic document.

Productivity application 411 is representative of an application suitable for opening and hosting an electronic document, as well as the collaboration component(s) associated with a given document. Examples include word processing applications, spreadsheet applications, email applications, presentation applications, messaging and communication applications, and any other productivity application, variation, or combination thereof. Productivity application 411 may be implemented as a natively installed and executed applications, a browser-based applications, a mobile app, a streaming application, or in any other manner.

Productivity application 411 includes collaboration framework 413, content framework 415, merge framework 417, and user interface 419. Content framework 413 includes software components and libraries that provide an electronic document in accordance with an electronic document model. Collaboration framework 413 includes software components and libraries that support collaboration components that execute in accordance with a serverless application model with data persistence. Merge framework 417 includes program logic for merging some or all of the electronic document provided by content framework 413 with the collaboration component(s) provided by collaboration framework 419.

User interface 419 includes program logic for displaying the combined user experience provided by merger framework 417. User interface 419 may communicate directly with merge framework 417, but in some scenarios may also communicate directly with content framework 413 and/or collaboration framework 415.

Collaboration component 406 is one example of collaboration components 405. Collaboration component 406 includes application logic 407 and state information 408. Application logic 407 includes statements that encode rules that govern the behavior of the collaboration component. The logic is interpreted, executed, or otherwise implemented by components of collaboration framework 415 to drive the user experience with respect to the collaboration component. The state of the component is recorded in a data structure 409 such as a table or a list and the state information in the data structure 409 is updated as changes are made locally or as updates are received from remote instances of the collaboration component. For example, state updates 451, 452, and 453 reflect changes made in the context of three different instances of the collaboration component, discussed above with respect to FIGS. 3A-3B.

In operation, productivity application 411 opens document container 401 to display an electronic document formed from the contents of content database 403 and collaboration container 404. Opening document container 401 includes reading one or more files from local storage, downloading the files from a remote location, or a combination of the two. Some or all of content database 403 is loaded into memory, as is some or all of collaboration container 404. The items in content database 403 are passed to content framework 413, while the items in collaboration container 404 are passed to collaboration framework 415.

Both frameworks execute against their respective items to produces views, layouts, frames, and/or other elements of a user experience. The elements are passed to merge framework 417 to produce a cohesive view of the electronic document that includes not just the views produced for native components of the electronic document, but also those of the collaboration component(s) that may be a part of the electronic document. As changes are made to the selected content locally, the state information 408 is changed and a state update is sent to a relay service to propagate to all other registered instances of the collaboration component. In the reverse direction, as changes are made in the local environments of the other instances of the collaboration component, updates to the state information 408 flow into the local environment and the updated state can be reflected in the user experience produced in user interface 419.

Figure 5:
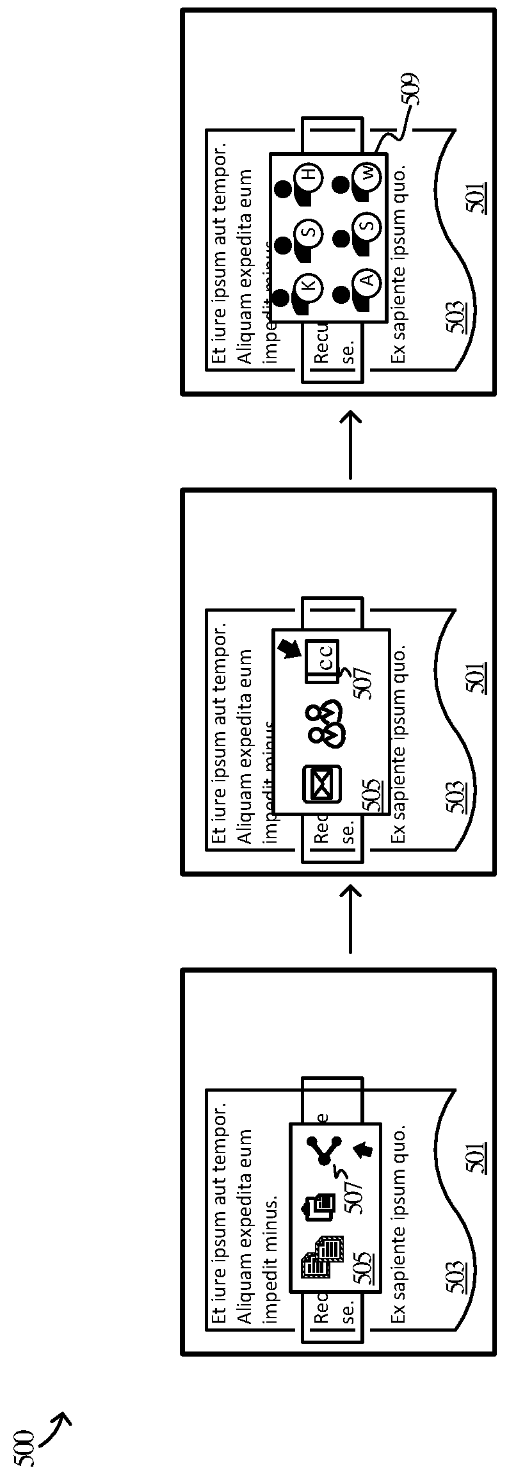
FIG. 5 illustrates a user experience in an implementation.

FIG. 5 illustrates an exemplary user experience 500 in an implementation of the concepts discussed above with respect to FIGS. 1-4. In user experience 500, an electronic document is opened by a productivity application and displayed in user interface 501. User interface 501 includes a document canvas 503 on which text and other such content is displayed. The productivity application includes various features and functionality such as the ability to select content and share it through a collaboration component. In this example, a user has selected a portion of the text on the document canvas 503. The selection causes an action menu 505 to surface which includes various options such as to copy the selected content, paste other content in its place, or to share the content via a share button 507.

Selecting the share button causes a second menu 505 to surface. The second menu 505 includes various options for sharing the selected content, including an email option, a contact option, and a new option represented by a button 507 for sharing via a collaboration component. Selecting button 507 causes a contact menu 509 to surface that includes a number of contacts associated with the user. The user can select one or more of the contacts and the collaboration component will be shared with those contacts accordingly.

In some cases, the underlying document may be a shared document and some of the users with whom the component is being shared may also already have access to the document. However, the selected content can also be shared with users who are not privy to the shared document. That is, the collaboration component allows the selected content to be shared with users without having to share the document itself. This allows the user/author/content creator to obtain feedback from users without the burden of sharing the entire document. Moreover, the users can view the selected content and provide their feedback without having to open the entire document, much less in an application specific to the document. Rather, the users can view the selected content from within the context of any application that supports the framework for rendering views of the collaboration component.

Figure 6:
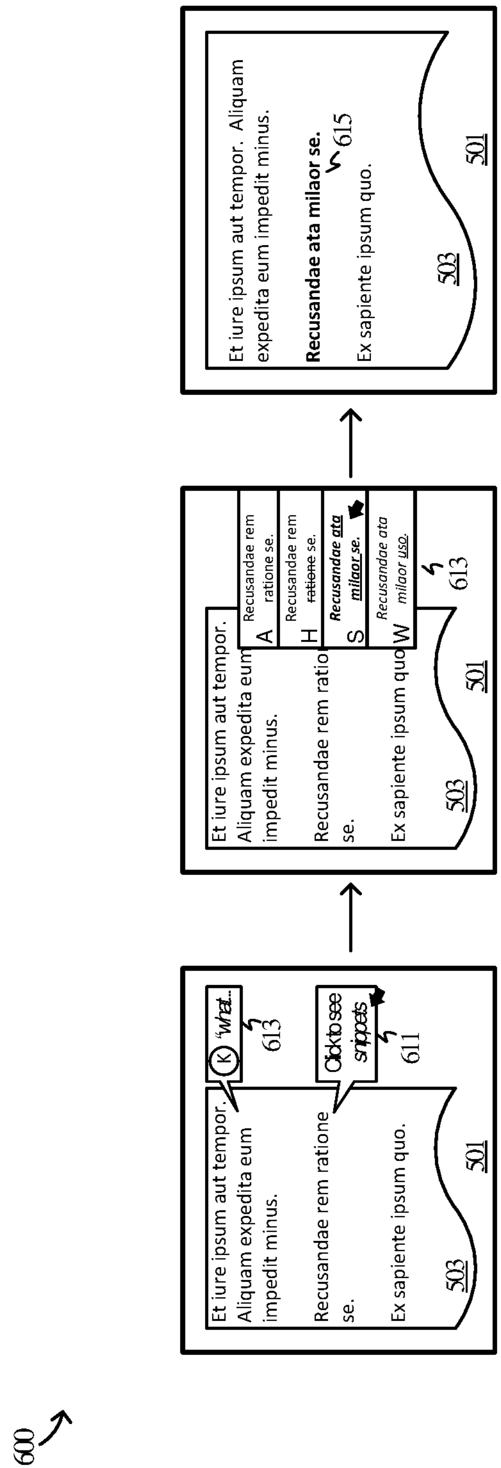
FIG. 6 illustrates a user experience in an implementation.

FIG. 6 illustrates user experience 600, which is a continuation of user experience 500. Having shared the selected content, the document canvas 503 is updated with a bubble 611 that indicates that a collaboration component was created from the nearby text. In a similar way, bubble 613 represents a "comment" that a user may have provided with respect to a section of the text. Bubble 611 differs from bubble 613 in that clicking on or otherwise selecting bubble 611 leads to a view 613 of the selected content and its state changes. For example, the original text as selected by user A is displayed, followed by the changes made in order by user H, then user S, and finally user W.

The user engaged with user interface 501 can select a preferred one of the changes and the selected change can be integrated into the document canvas. In this example, the user selects the change made by user S and the change is persisted to the actual text in the document canvas. Assuming changes to the document canvas are saved, the selected change is persisted to the electronic document itself, such as to the content database in a document container or file.

Figure 7:
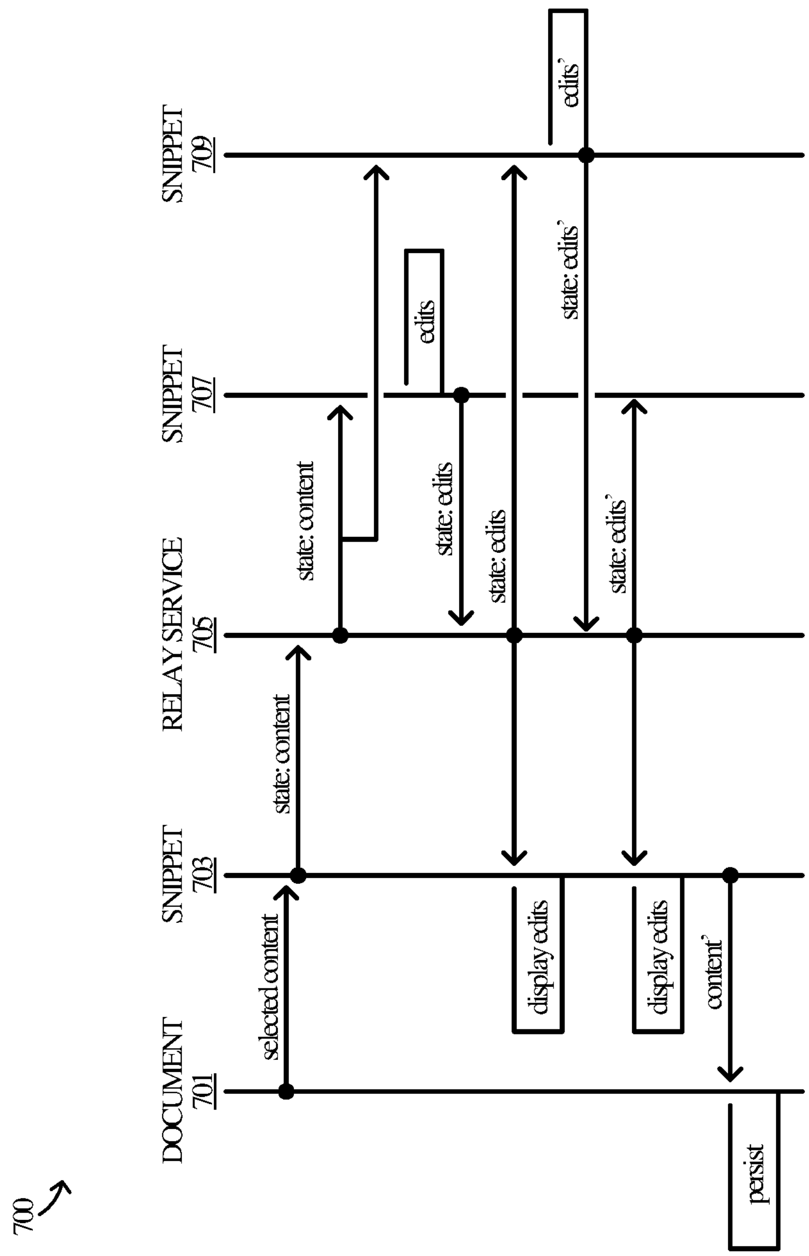
FIG. 7 illustrates an operational sequence in an implementation.

FIG. 7 illustrates an operational sequence 700 in a highly simplified example. Operational sequence 700 involves a collaboration environment that includes a document 701, a snippet 703, a relay service 705, and two more snippets: snippet 707 and snippet 709. Each snippet is representative of a local instance of a collaboration component as disclosed herein. The shared state of the collaboration component is distributed through relay service 705 as changes are made to the content of the components.

For example, content is selected in document 701 to be shared through a "snippet." The selected content is read from the document and provided to snippet 703. Snippet 703 may be visible or otherwise accessible within the same user experience and/or application environment as document 701. The other instances of snippet 703 are instantiated through relay service 705 such that state changes to snippet 703 can be reproduced in snippet 707 and snippet 709, and vice-versa. Thus, snippet 703 provides an update to relay service 705 that indicates its state change. Its stage change is relayed to snippet 707 and snippet 709. Both update their local state information such that the selected content from document 701 can be displayed within their respective application environments.

It is assumed for exemplary purposes that a user makes an edit to the selected content from within snippet 707. Accordingly, snippet 707 provides a state update to relay service 705 which, in turn, relays the state change to snippet 703 and snippet 709. Snippet 703 may display the edits locally with respect to document 701.

Subsequent to the first edit, another user makes an edit through snippet 709. Snippet 709 communicates the state change to relay service 705 and relay service 705 passes it on to snippet 703 and snippet 707. Snippet 703 can display the second edits either an integrated manner with respect to the first edit, or as an independent edit. In either case, the user engaged with document 701 can choose to accept one or both of the changes, at which point the changes can be persisted to document 701.

Figure 8:
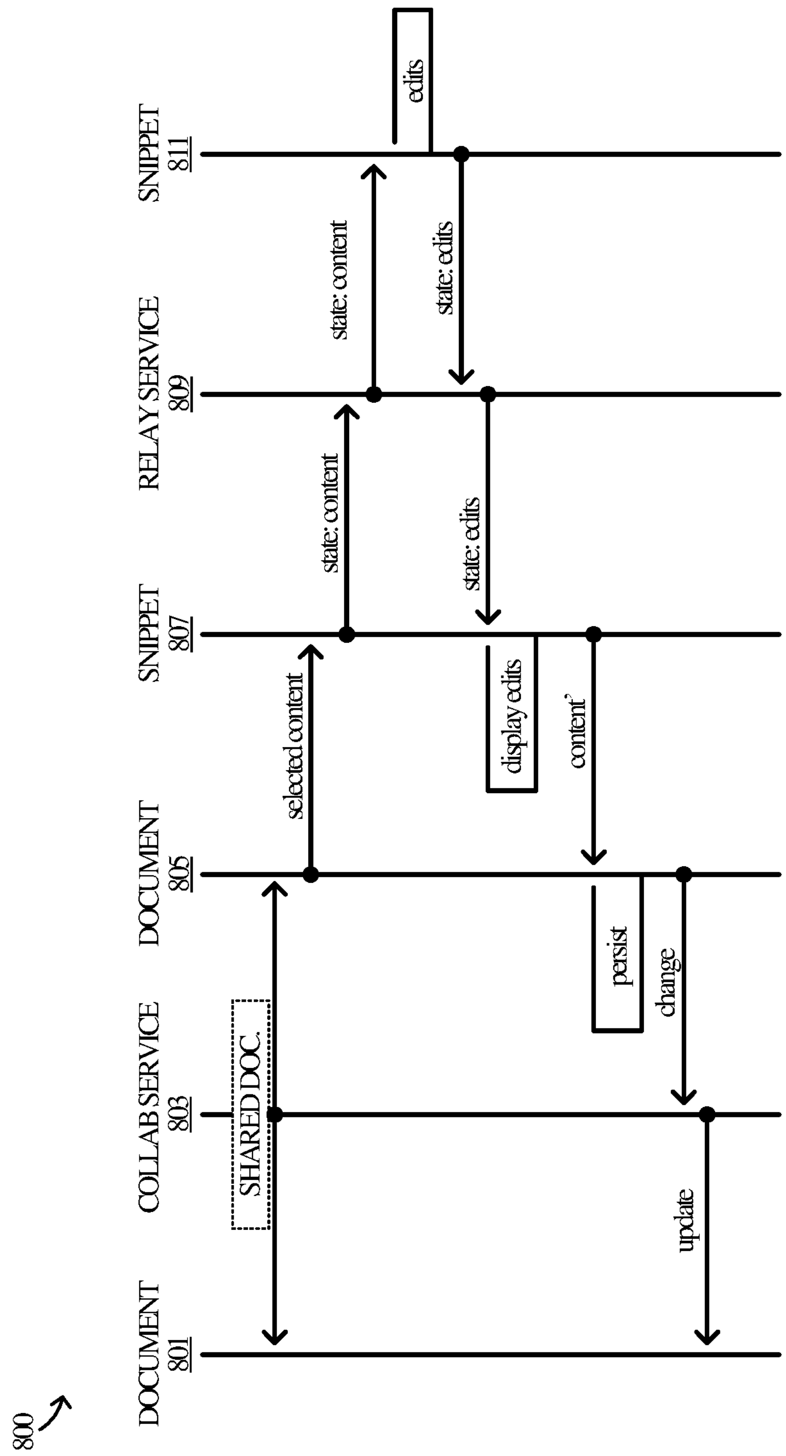
FIG. 8 illustrates another operational sequence in an implementation.

FIG. 8 illustrates an exemplary operational scenario involving a shared document. In operational scenario 800, document 801 is one instance of a shared document that is shared with multiple users through a collaboration service, while document 805 is another instance of the shared document.

A user engaged with document 805 determines to share selected content via snippet 807. Snippet 807 is an instance of a collaboration component generated by the application that hosts document 805 for the purpose of sharing selected content through relay service 809. The selected content is shared through other instances of the component that are registered in association with the users with whom the component is to be shared. Note that the other users need not be all the same as those authorized to share the document. For example, the selected content is shared with snippet 811, which it is assumed for exemplary purposes has no connection to document 801, nor the user or application environment associated with document 801. In other words, the user associated with snippet 811 is not one of the users with whom the shared document has been shared.

That user proceeds to make an edit to the shared content through snippet 811. The edit is returned to snippet 807 through relay service 809 and is displayed to the user in the application environment of snippet 807. The edits are displayed within the context of a view of the snippet, rather than as part of document 805. It is further assumed that the user determines to accept the suggested edit. Doing so causes the changes to be persisted to document 805. This causes a state change in the shared electronic document itself, which is captured by collaboration service 803 and is propagated to document 801.

Various technical effect may be appreciated from the present disclosure. In various implementations, the proposed integration of productivity applications with collaboration components allow content to be shared in a lightweight manner. That is, rather than having to maintain a shared copy of a document on a central server, portions of the document can be shared through the distributed data structure of the collaboration components. Moreover, the speed at which changes can be synchronized across all instances of the collaboration component reduce the time required for users to see each other's changes in real-time. The proposed integration also reduces the complexity of sharing since an entire document need not be shared. Rather, just small portions or "snippets" of a document can be shared.

FIG. 9 illustrates computing device 901 that is representative of any system or collection of systems in which the various processes, programs, services, and scenarios disclosed herein may be implemented. Examples of computing device 901 include, but are not limited to, desktop and laptop computers, tablet computers, mobile computers, and wearable devices. Examples may also include server computers, web servers, cloud computing platforms, and data center equipment, as well as any other type of physical or virtual server machine, container, and any variation or combination thereof.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements collaboration process 906, which is representative of the collaboration processes discussed with respect to the preceding Figures. When executed by processing system 902, software 905 directs processing system 902 to operate as described herein for at least the various processes, operational scenarios, and sequences discussed in the foregoing implementations. Computing device 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including collaboration process 906) may be implemented in program instructions and among other functions may, when executed by processing system 902, direct processing system 902 to operate as described with respect to the various operational scenarios, sequences, and processes illustrated herein. For example, software 905 may include program instructions for implementing a collaboration process as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to perform collaboration operations in an optimized manner. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage, as well as other factors.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

It may be appreciated that, while the inventive concepts disclosed herein are discussed in the context of such productivity applications, they apply as well to other contexts such as gaming applications, virtual and augmented reality applications, business applications, and other types of software applications. Likewise, the concepts apply not just to electronic documents, but to other types of content such as in-game electronic content, virtual and augmented content, databases, and audio and video content.

Indeed, the included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the disclosure. Those skilled in the art will also appreciate that the features described above may be combined in various ways to form multiple embodiments. As a result, the invention is not limited to the specific embodiments described above, but only by the claims and their equivalents.

What is claimed is:

1. A computing apparatus comprising:

one or more computer readable storage media;

one or more processors operatively coupled with the one or more computer readable storage media; and a productivity application comprising program instructions stored on the one or more computer readable storage media that, when executed by the one or more processors, direct the computing apparatus to at least:

open an electronic document in a user interface to the productivity application;

receive input via the user interface comprising a selection of text from the electronic document, and further comprising an indication to share the text with other users in other productivity applications;

share the text with the other users via other instances of a collaboration component hosted by the other productivity applications, wherein the collaboration component comprises a distributed data structure that stores state information about the text, and further comprises application logic for managing the state information to reflect changes made to the text in a context of each of the other productivity applications, wherein the context of at least one application of the other productivity applications differs relative to that of the productivity application, and wherein the one application comprises a different type of application than the productivity application;

receive the changes from an instance of the collaboration component hosted in the productivity application, wherein the changes include a change made to the text in the context of the one application and communicated to the instance of the collaboration component via an update to the state information by one instance of the collaboration component in the context of the one application; and display the changes in the user interface.

2. The computing apparatus of claim 1 wherein the program instructions direct the computing apparatus to display each of the changes in the user interface as a change made natively with respect to the electronic document.

3. The computing apparatus of claim 1 wherein the collaboration component comprises a serverless application model, wherein the other instances of the collaboration component synchronize the state information with each other through an online relay service.

4. The computing apparatus of claim 1 wherein the users make the changes to the text from within the other productivity applications and wherein the program instructions further direct the computing apparatus to persist at least one of the changes to the electronic document.

5. The computing apparatus of claim 1 wherein the productivity application comprises a word processing application, and wherein to display the changes in the user interface, the program instructions direct the computing apparatus to display the changes to reflect an order in which the changes were made.

6. The computing apparatus of claim 5 wherein the one application comprises one of an email application, a messaging application, and a storage application.

7. The computing apparatus of claim 1 wherein the program instructions further direct the computing apparatus to save the collaboration component to a catalog of collaboration components available to a creator of the electronic document.

8. A method of operating a computing device comprising:

opening an electronic document in a user interface to a productivity application;

in the productivity application, receiving input via the user interface comprising a selection of text from the electronic document, and further comprising an indication to share the text with users in other productivity applications;

in the productivity application, sharing the text with the users other instances of a collaboration component hosted by the other productivity applications, wherein the collaboration component comprises a distributed data structure that stores state information about the text, and further comprises application logic for managing the state information to reflect changes made to the text in a context of each of the other productivity applications, wherein the context of at least one application of the other productivity applications differs relative to that of the productivity application, and wherein the one application comprises a different type of application than the productivity application;

in the productivity application, receiving the changes from an instance of the collaboration component hosted in the productivity application, wherein the changes include a change made to the text in the context of the one application and communicated to the instance of the collaboration component via an update to the state information by one instance of the collaboration component in the context of the one application; and in the productivity application, displaying the changes in the user interface to the productivity application.

9. The method of claim 8 further comprising surfacing the changes in the user interface as a change made natively with respect to the electronic document.

10. The method of claim 9 wherein the collaboration component comprises a serverless application model, and wherein the other instances of the collaboration component synchronize the state information with each other through a relay service.

11. The method of claim 8 wherein the users make the changes to the text from within the other productivity applications.

12. The method of claim 8 wherein the productivity application comprises a word processing application, and wherein displaying the changes in the user interface to the productivity application comprises displaying the changes to reflect an order in which the changes were made.

13. The method of claim 12 wherein the one application comprises one of an email application, a messaging application, and a storage application.

14. The method of claim 8 further comprising saving the collaboration component to a catalog of collaboration components available to a creator of the electronic document.

15. One or more non-transitory computer readable storage media having program instructions stored thereon that, when executed by one or more processors, direct a computing apparatus to at least:

display an electronic document in a user interface to the productivity application;

receive input via the user interface comprising a selection of text from the electronic document, and further comprising an indication to share the text with other users in other productivity applications; and share the text with the users via other instances of a collaboration component hosted by the other productivity applications, wherein the collaboration component comprises a distributed data structure that stores state information about the text, and further comprises application logic for managing the state information to reflect changes made to the text by the one or more users in a context of each of the other productivity applications, wherein the context of at least one application of the other productivity applications differs relative to that of the productivity application, and wherein the one application comprises a different type of application than the productivity application.

16. The one or more non-transitory computer readable storage media of claim 15 wherein the program instructions further direct the computing apparatus to:

receive the changes from an instance of the collaboration component hosted in the productivity application, wherein the changes include a change made to the text in the context of the one application and communicated to the instance of the collaboration component via an update to the state information by one instance of the collaboration component in the context of the one application;

display the changes in the user interface; and persist at least one of the changes to storage in the electronic document.

17. The one or more non-transitory computer readable storage media of claim 16 wherein the program instructions direct the computing apparatus to display the changes in the user interface as a change made natively with respect to the electronic document.

18. The one or more non-transitory computer readable storage media of claim 15 wherein the collaboration component comprises a serverless application model, wherein the other instances of the collaboration component synchronize the state information with each other through a relay service.

19. The one or more non-transitory computer readable storage media of claim 15 wherein the productivity application comprises a word processing application, and wherein to display the changes in the user interface, the program instructions direct the computing apparatus to display the changes to reflect an order in which the changes were made.

20. The one or more non-transitory computer readable storage media of claim 15 wherein the program instructions further direct the computing apparatus to save the collaboration component to a catalog of collaboration components available to a creator of the electronic document.

* * * * *